United States Patent
Saint et al.

(10) Patent No.: US 10,972,257 B2
(45) Date of Patent: Apr. 6, 2021

(54) MULTI-LEVEL COMMUNICATION ENCRYPTION

(71) Applicant: Visa International Service Association, San Francisco, CA (US)

(72) Inventors: Eric Le Saint, Los Altos, CA (US); Yue Chen, Mountain View, CA (US); Marc Kekicheff, Foster City, CA (US); Dominique Fedronic, Belmont, CA (US)

(73) Assignee: Visa International Service Association, San Francisco, CA (US)

( * ) Notice: Subject to any disclaimer, the term of this patent is extended or adjusted under 35 U.S.C. 154(b) by 151 days.

(21) Appl. No.: 16/084,480

(22) PCT Filed: Jun. 7, 2017

(86) PCT No.: PCT/US2017/036380
§ 371 (c)(1),
(2) Date: Sep. 12, 2018

(87) PCT Pub. No.: WO2017/214288
PCT Pub. Date: Dec. 14, 2017

(65) Prior Publication Data
US 2019/0089531 A1      Mar. 21, 2019

Related U.S. Application Data

(60) Provisional application No. 62/346,968, filed on Jun. 7, 2016.

(51) Int. Cl.
*H04L 29/06* (2006.01)
*H04L 9/08* (2006.01)
(Continued)

(52) U.S. Cl.
CPC ........... *H04L 9/0827* (2013.01); *G06Q 20/20* (2013.01); *G06Q 20/3829* (2013.01);
(Continued)

(58) Field of Classification Search
CPC ... H04L 63/08; H04L 63/083; H04L 63/0853; G06F 21/31; H04W 12/06
(Continued)

(56) References Cited

U.S. PATENT DOCUMENTS 6,084,969 A    7/2000  Wright et al.
6,453,159 B1   9/2002  Lewis
(Continued)

FOREIGN PATENT DOCUMENTS

CN    103795692    5/2014
CN    105900375    8/2016
(Continued)

OTHER PUBLICATIONS

EP17810946.8, "Extended European Search Report", dated May 20, 2019, 6 pages.
(Continued)

*Primary Examiner* — Evans Desrosiers
(74) *Attorney, Agent, or Firm* — Kilpatrick Townsend & Stockton LLP

(57) ABSTRACT

Techniques are provided to generate a secure communication for use in a transaction. In some embodiments, a user device is provided a first set of encryption keys associated with one or more authorizing entities. The user device may, prior to or during a transaction, receive one or more second encryption keys related to a second party to the transaction. In some embodiments, the one or more second encryption keys may be provided to the user device via a local communication means. Once the user device has been provided with transaction details, it may generate a transaction request
(Continued)

using the multiple encryption keys that it has been provided, such that portions of the message are encrypted using different encryption keys.

20 Claims, 7 Drawing Sheets

(51) Int. Cl.
| | |
|---|---|
| H04L 9/14 | (2006.01) |
| H04W 12/041 | (2021.01) |
| H04W 12/069 | (2021.01) |
| G06Q 20/20 | (2012.01) |
| G06Q 20/38 | (2012.01) |
| H04W 4/80 | (2018.01) |

(52) U.S. Cl.
CPC .............. *H04L 9/0861* (2013.01); *H04L 9/14* (2013.01); *H04L 63/0428* (2013.01); *H04L 63/061* (2013.01); *H04L 63/08* (2013.01); *H04L 63/102* (2013.01); *H04L 63/107* (2013.01); *H04W 12/041* (2021.01); *H04W 12/069* (2021.01); *H04W 4/80* (2018.02)

(58) Field of Classification Search
USPC ........................................................ 713/171
See application file for complete search history.

(56) References Cited

U.S. PATENT DOCUMENTS

| | | |
|---|---|---|
| 7,254,232 B2 | 8/2007 | DiSanto et al. |
| 7,590,861 B2 | 9/2009 | Abdallah et al. |
| 7,627,760 B2 | 12/2009 | Lauter et al. |
| 7,707,420 B1 | 4/2010 | Little et al. |
| H2270 H | 6/2012 | Le Saint et al. |
| 8,200,974 B1 | 6/2012 | DiSanto et al. |
| 8,533,471 B2 | 9/2013 | Falk et al. |
| 8,543,821 B1 | 9/2013 | Gabrielson |
| 8,621,036 B1 | 12/2013 | L'heureux et al. |
| 8,954,740 B1 | 2/2015 | Moscaritolo et al. |
| 9,647,832 B2 | 5/2017 | Le Saint et al. |
| 9,813,245 B2 | 11/2017 | Le Saint |
| 9,967,090 B2 | 5/2018 | Le Saint |
| 10,129,020 B2 | 11/2018 | Le Saint |
| 2003/0005317 A1 | 1/2003 | Audebert et al. |
| 2003/0051159 A1 | 3/2003 | McCown et al. |
| 2003/0115453 A1 | 6/2003 | Grawrock et al. |
| 2004/0139329 A1* | 7/2004 | Abdallah .............. H04L 9/0894 713/182 |
| 2004/0205248 A1 | 10/2004 | Little et al. |
| 2005/0066174 A1 | 3/2005 | Perlman |
| 2005/0066175 A1 | 3/2005 | Perlman et al. |
| 2005/0084114 A1 | 4/2005 | Jung et al. |
| 2005/0149732 A1 | 7/2005 | Freeman et al. |
| 2006/0265595 A1 | 11/2006 | Scottodiluzio et al. |
| 2007/0028090 A1 | 2/2007 | Lopez et al. |
| 2007/0033403 A1 | 2/2007 | Lauter et al. |
| 2007/0288743 A1 | 12/2007 | Cam-Winget et al. |
| 2008/0040603 A1 | 2/2008 | Stedron |
| 2008/0133918 A1 | 6/2008 | You et al. |
| 2009/0044019 A1 | 2/2009 | Lee et al. |
| 2009/0318114 A1 | 12/2009 | Bertoni et al. |
| 2011/0208970 A1 | 8/2011 | Brown et al. |
| 2011/0307698 A1 | 12/2011 | Vanstone et al. |
| 2012/0066505 A1 | 3/2012 | Brown et al. |
| 2012/0082312 A1 | 4/2012 | Liu et al. |
| 2012/0087493 A1 | 4/2012 | Chidambaram et al. |
| 2012/0137132 A1 | 5/2012 | Le Saint |
| 2012/0144193 A1 | 6/2012 | Le Saint et al. |
| 2012/0221858 A1 | 8/2012 | Struik et al. |
| 2012/0314865 A1 | 12/2012 | Kitchen et al. |
| 2013/0016831 A1 | 1/2013 | Lambert et al. |
| 2013/0080777 A1 | 3/2013 | Martell et al. |
| 2013/0091353 A1 | 4/2013 | Zhang et al. |
| 2013/0111209 A1 | 5/2013 | Harkins |
| 2013/0195271 A1 | 8/2013 | Miyabayashi et al. |
| 2013/0219189 A1 | 8/2013 | Simmons et al. |
| 2013/0301828 A1 | 11/2013 | Gouget et al. |
| 2013/0318344 A1 | 11/2013 | Brown et al. |
| 2013/0332739 A1 | 12/2013 | Yi et al. |
| 2014/0003604 A1 | 1/2014 | Campagna et al. |
| 2014/0013121 A1 | 1/2014 | Sherkin et al. |
| 2014/0108262 A1 | 4/2014 | Plateaux et al. |
| 2014/0208117 A1 | 7/2014 | Hayashi et al. |
| 2014/0281542 A1 | 9/2014 | O'hare et al. |
| 2014/0365776 A1 | 12/2014 | Smets et al. |
| 2015/0019443 A1 | 1/2015 | Sheets et al. |
| 2015/0088756 A1 | 3/2015 | Makhotin et al. |
| 2015/0200774 A1 | 7/2015 | Le Saint |
| 2015/0213433 A1 | 7/2015 | Khan |
| 2015/0350119 A1 | 12/2015 | Thirumalai et al. |
| 2015/0372811 A1 | 12/2015 | Le Saint et al. |
| 2016/0065370 A1 | 3/2016 | Le Saint et al. |
| 2016/0218875 A1 | 7/2016 | Le Saint et al. |
| 2017/0222801 A1 | 8/2017 | Le Saint |
| 2017/0245146 A1* | 8/2017 | Rolfe ................. G06Q 20/3829 |
| 2018/0026787 A1 | 1/2018 | Le Saint et al. |

FOREIGN PATENT DOCUMENTS

| | | |
|---|---|---|
| CN | 106664206 | 5/2017 |
| CN | 106797311 | 5/2017 |
| CN | 107210914 | 9/2017 |
| EP | 1063813 | 12/2000 |
| EP | 1906587 | 4/2008 |
| EP | 2073430 | 6/2009 |
| EP | 2163067 | 3/2010 |
| EP | 3095210 | 11/2016 |
| EP | 3158680 | 4/2017 |
| EP | 3195521 | 7/2017 |
| EP | 3251284 | 12/2017 |
| KR | 1020080074956 | 12/2008 |
| SG | 11201704984 S | 6/2018 |
| WO | 2013023968 | 2/2013 |
| WO | 2014109283 | 7/2014 |
| WO | 2015106248 | 7/2015 |
| WO | 2015195978 | 12/2015 |
| WO | 2016033610 | 3/2016 |
| WO | 2016123264 | 8/2016 |
| WO | 2017106793 | 6/2017 |
| WO | 2017214288 | 12/2017 |

OTHER PUBLICATIONS

U.S. Appl. No. 14/595,792 , "Final Office Action", dated Aug. 18, 2016, 11 pages.

U.S. Appl. No. 14/595,792 , "Non-Final Office Action", dated Jan. 20, 2016, 10 pages.

U.S. Appl. No. 14/595,792 , "Notice of Allowance", dated Jan. 5, 2017, 14 pages.

U.S. Appl. No. 14/743,874 , "Advisory Action", dated Jul. 19, 2018, 3 pages.

U.S. Appl. No. 14/743,874 , "Efficient Methods for Authenticated Communication", filed Jun. 18, 2015, 85 pages.

U.S. Appl. No. 14/743,874 , "Final Office Action", dated Nov. 30, 2016, 21 pages.

U.S. Appl. No. 14/743,874 , "Final Office Action", dated Mar. 27, 2018, 28 pages.

U.S. Appl. No. 14/743,874 , "Non-Final Office Action", dated Oct. 10, 2017, 18 pages.

U.S. Appl. No. 14/743,874 , "Non-Final Office Action", dated Jun. 22, 2016, 20 pages.

U.S. Appl. No. 14/841,589 , "Non-Final Office Action", dated Dec. 16, 2016, 11 pages.

U.S. Appl. No. 14/841,589 , "Notice of Allowance", dated Jun. 30, 2017, 8 pages.

U.S. Appl. No. 15/489,409 , "Non-Final Office Action", dated Jul. 3, 2017, 11 pages.

(56) References Cited

OTHER PUBLICATIONS

U.S. Appl. No. 15/489,409, "Notice of Allowance", dated Nov. 29, 2017, 5 pages.
U.S. Appl. No. 15/723,001, "Non-Final Office Action", dated Mar. 9, 2018, 13 pages.
U.S. Appl. No. 15/920,271, "Notice of Allowance", dated Jul. 12, 2018, 19 pages.
U.S. Appl. No. 62/014,102, "U.S. Provisional Application", Efficient Methods for Authenticated Communication, filed Jun. 18, 2014, 108 pages.
U.S. Appl. No. 62/016,048, "U.S. Provisional Application", Efficient Methods for Forward Secure Authenticated Communication, filed Jun. 23, 2014, 177 pages.
U.S. Appl. No. 62/044,172, "U.S. Provisional Application", Methods for Secure Cryptogram Generation, filed Aug. 29, 2014, 106 pages.
Brzuska et al., "An Analysis of the EMV Channel Establishment Protocol", International Association for Cryptologic Research, vol. 20131105:113226, Nov. 5, 2013, pp. 1-30.
Brzuska et al., "An Analysis of the EMV Channel Establishment Protocol", CCS'13, Berlin, Germany, ACM 978 1-4503-2477—Sep. 13, 2011, Nov. 4-8, 2013, pp. 373-385.
Dagdelen et al., "A Cryptographic Analysis of Opacity", International Association for Cryptologic Research, vol. 20130429:112002, Apr. 22, 2013, pp. 1-46.
EP15735349.1, "Extended European Search Report", dated May 2, 2018, 9 pages.
EP15735349.1, "Partial Supplementary European Search Report", dated Dec. 14, 2017, 9 pages.
EP15810102.2, "Extended European Search Report", dated Jan. 9, 2018, 6 pages.
EP15835007.4, "Extended European Search Report", dated Feb. 9, 2018, 8 pages.
EP16744062.7, "Extended European Search Report", dated Jul. 6, 2018, 10 pages.
EP16818857.1, "Extended European Search Report", dated May 14, 2018, 9 pages.
Garrett et al., "Preventing Eavesdroppers from Tracking Payments", Blinded Diffie, EMVCo Security Working Group, Security Standardisation Research, vol. 8893, Dec. 16, 2014, pp. 79-92.
HCE and BLE University, "Tomorrow's Transactions", Available online at: http://tomorrowstransactions.com, Mar. 20, 2014, 18 pages.
PCT/US2015/011153, "International Search Report and Written Opinion", dated Apr. 28, 2015, 10 pages.
PCT/US2015/036524, "International Search Report and Written Opinion", dated Sep. 30, 2015, 10 pages.
PCT/US2015/047824, "International Search Report and Written Opinion", dated Dec. 8, 2015, 11 pages.
PCT/US2016/015218, "International Search Report and Written Opinion", dated May 12, 2016, 17 pages.
PCT/US2016/067386, "International Preliminary Report on Patentability", dated Jun. 28, 2018, 13 pages.
PCT/US2017/036380, "International Search Report and Written Opinion", dated Oct. 13, 2017, 14 pages.
SG11201704984S, "Notice of Decision to Grant", dated Apr. 18, 2018, 8 pages.
, "Onion Routing", Wikipedia, Available online at https://en.wikipedia.org/w/index.php?title=Onion_routing&oldid=691457365, Nov. 19, 2015, 5 pages.
U.S. Appl. No. 14/743,874, "Non Final Office Action", dated Dec. 27, 2018, 30 pages.
U.S. Appl. No. 15/723,001, "Final Office Action", dated Nov. 28, 2018, 7 pages.
EP16876873.7, "Extended European Search Report", dated Nov. 22, 2018, 9 pages.
SG11201807726Q, "Written Opinion", dated Feb. 25, 2020, 8 pages.
EP17810946.8, "Office Action", dated Jun. 18, 2020, 4 pages.
U.S. Appl. No. 15/920,236, "Non-Final Office Action", dated Sep. 20, 2018, 7 pages.
PCT/US2016/067386, "International Search Report and Written Opinion", dated Apr. 3, 2017, 17 pages.
Application No. CN201780034296.0, Office Action, dated Nov. 27, 2020, 10 pages.
Application No. SG11201807726Q, Further Written Opinion, dated Nov. 24, 2020, 8 pages.

\* cited by examiner

MULTI-LEVEL COMMUNICATION ENCRYPTION

CROSS REFERENCE TO RELATED APPLICATIONS

This application is the US national stage of PCT/US2017/036380, filed Jun. 7, 2017, which claims priority to Provisional U.S. Patent Application No. 62/346,968, filed Jun. 7, 2016, which is herein incorporated by reference. Additionally, this application is related to commonly owned PCT Application No. PCT/US2016/040586, filed Jun. 30, 2016; PCT Application No. PCT/US2016/040590, filed Jun. 30, 2016; U.S. Patent Publication No. 2016-0241389, published Aug. 8, 2016; U.S. Publication No. 2016-0065370, published Mar. 3, 2016; U.S. Publication No. 2015-0372811, published Dec. 24, 2015, U.S. Publication No. 2015-0200774, published Jul. 16, 2106 and PCT Application No. PCT/US2016/067386, filed Dec. 16, 2016, the disclosures of which are incorporated by reference in their entirety for all purposes.

BACKGROUND

In cryptography, a secure channel is a way of transferring data that is resistant to eavesdropping and tampering; a secure channel may be created between two computers by establishing a shared secret between the two computers. Diffie-Hellman key agreement is a well-known method for establishing such a shared secret between two computers. In the Diffie-Hellman protocol, each of two computers maintains a public/private key pair. Each computer shares its public key with the other computer. Each computer then combines their private key with the public key received from the other computer to determine the shared secret. Due to the properties of the public/private key pairs, the shared secret derived by each of the computers will be identical.

Additionally, typical key agreements require a device to communicate over a network encryption details via a handshaking protocol. Such processes can be slow and constraining.

Such a secure communication occurs between two computers. But, existing techniques are not well suited for more complex communication scenarios.

Embodiments of the invention address these and other problems, individually and collectively.

BRIEF SUMMARY

To address the above concerns, embodiments of the disclosure are directed to methods, systems, and apparatuses (e.g., a user device or server device) for generating and transmitting a secure message. A secure message may be any message provided to one or more computing entities. The secure message may be used to convey sensitive information to multiple computing entities. In some embodiments, the secure message may be an authorization message (i.e., a message used to initiate authorization for access to a resource). The secure message may be generated by a user device using multiple encryption keys stored on the user device. In some embodiments, the secure message may be generated upon receiving transaction data that includes information related to a resource to be obtained by the user device.

One embodiment of the disclosure is directed to a method comprising storing a credential and a first encryption key for encrypting the credential for sending in a communication to an authorization server. The method also comprises obtaining a second encryption key for encrypting data within a communications for an access server. Upon receiving resource information about a resource from an access device, the method comprises generating a message including a first portion of data encrypted using the first encryption key and a second portion of data encrypted using the second encryption key. The method further comprises providing the message over a wide area network to an authorization server and the access server, triggering the authorization server to provide the authorization response.

Another embodiment of the disclosure is directed to a user device comprising: one or more processors; and a memory including instructions that, when executed by the one or more processors, cause the one or more processors to: receive a first encryption key from a first computer via a network connection, receive a second encryption key from a second computer via a local communication interface, receive details related to a secure message to be generated using the user device, generate the secure message that includes at least a first portion of data encrypted using the first encryption key and a second portion of data encrypted using the second encryption key, and transmit the generated secure message to the access device.

Another embodiment of the disclosure is directed to an authorization computer comprising: a processor; and a memory including instructions that, when executed with the processor, cause the authorization computer to, at least: receive, from a user device, a request for an access credential, the access credential capable of being used to access a resource, provide, in response to receiving the request, the access credential and an encryption key, receive, from a computing device, an authorization request message, the authorization request message comprising multiple portions of data, each encrypted using a different encryption key, at least one portion of data of the multiple portions of data being encrypted using the encryption key, decrypt the at least one portion of data to identify transaction data, determine, based at least in part on the transaction data, whether to approve the transaction, and provide an authorization response message to a provider of the resource.

A better understanding of the nature and advantages of embodiments of the present invention may be gained with reference to the following detailed description and the accompanying drawings.

BRIEF DESCRIPTION OF THE DRAWINGS

Various embodiments in accordance with the present disclosure will be described with reference to the drawings, in which.

TERMS

Figure 1:
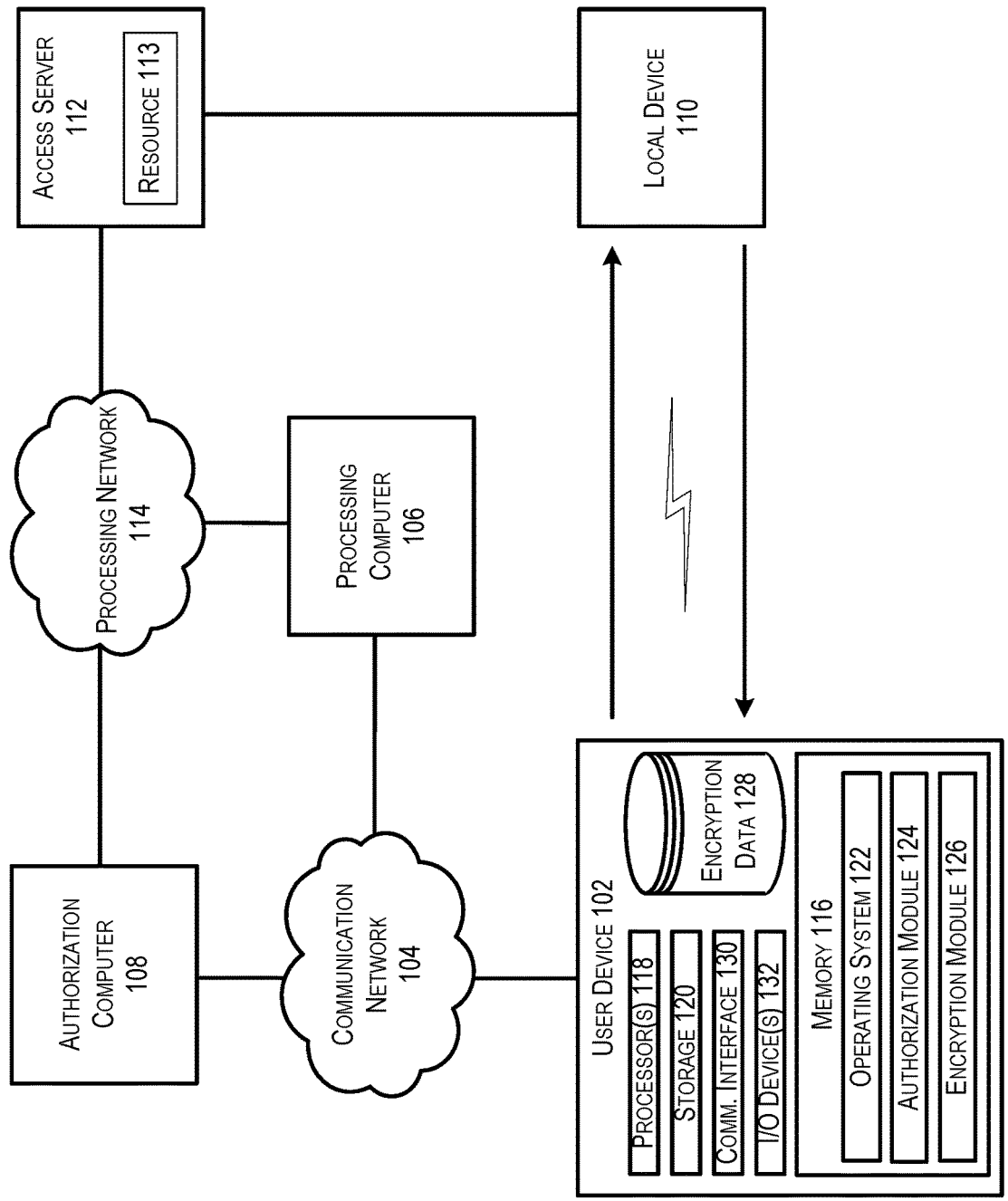
FIG. 1 depicts an example system architecture capable of implementing at least some embodiments in accordance with the disclosure.

Prior to discussing specific embodiments of the invention, some terms may be described in detail.

A "access credential" or "credential" may be any identifier or sequence of characters configured to enable access to a resource. In some embodiments, the resource accessed using an access credential can be a restricted or secure area, restricted or secure storage, etc. In various embodiments, an access credential may be a string of characters that corresponds to account information, a password or code, or a cryptographic key that is used to generate information to gain access to a resource. An access credential can also be a dynamic key that changes over time, and/or a limited-use key whose usage is limited by one or more limited-use conditions.

An "access device" may be any suitable device for communicating with an access computer or payment processing network, and for interacting with a payment device, a user computer apparatus, and/or a user mobile device. An access device may generally be located in any suitable location, such as at the location of a merchant. An access device may be in any suitable form. Some examples of access devices include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems. Websites, and the like. An access device may use any suitable contact or contactless mode of operation to send or receive data from, or associated with, a portable communication device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a portable communication device. In some embodiments, an access device may also be referred to as a terminal device.

An "authorization request message" may be an electronic message that is sent to request authorization for access for a user (e.g., to conduct a transaction for a resource, gain entry to a building, or log in to an account). The authorization request message can be sent to a payment processing network and/or an issuer of a payment card. An authorization request message according to some embodiments may comply with ISO 8583, which is a standard for systems that exchange electronic transaction information associated with a payment made by a user using a payment device or payment account. The authorization request message may include information that can be used to identify an account. An authorization request message may also comprise additional data elements such as one or more of a service code, an expiration date, etc. An authorization request message may also comprise transaction information, such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

An "authorization response message" may be an electronic message reply to an authorization request message. The authorization response message may include instructions to enable access for a user (e.g., to a resource). In some embodiments, enabling access to a resource may comprise enabling access to a secure area or storage. In some embodiments, enabling access to a resource may comprise an authorization to complete a transaction for the resource. The authorization response message can be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant computer that indicates approval of the transaction. The code may serve as proof of authorization. As noted above, in some embodiments, a payment processing network may generate or forward the authorization response message to the merchant.

An "issuer" may typically refer to a business entity (e.g., a bank) that maintains an account for a user that is associated with a portable communication device such as an account enrolled in a mobile application installed on a portable communication device. An issuer may also issue account parameters associated with the account to a portable communication device. An issuer may be associated with a host system that performs some or all of the functions of the issuer on behalf of the issuer.

A "merchant" may typically be an entity that engages in transactions and can sell goods or services, or provide access to goods or services.

The term "provisioning" may include any preparation and/or configuring of a device to enable it to perform a function. For example, provisioning may include storing encryption keys, rules, protocols (e.g., encryption protocols), and/or instructions on a device to direct the device's actions. In some embodiments, a device may be provisioned with an encryption key associated with an authorization computer and/or any number of encryption keys associated with any number of computing entities.

The term "resource" generally refers to any asset that may be used or consumed. For example, the resource may be computer resource (e.g., stored data or a networked computer account), a physical resource (e.g., a tangible object or a physical location), or other electronic resource or communication between computers (e.g., a communication signal corresponding to an account for performing a transaction). Some non-limiting examples of a resource may be a good or service, a physical building, a computer account or file, or a payment account.

The term "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "token" may include a substitute identifier for some information. For example, a payment token may include an identifier for a payment account that is a substitute for an account identifier, such as a primary account number (PAN). For instance, a token may include a series of alphanumeric characters that may be used as a substitute for an original account identifier. For example, a token "4900 0000 0000 0001" may be used in place of a PAN "4147 0900 0000 1234." During a transaction, instead of using a real account identifier (e.g., a PAN) to identify the account of the user, a token can be used instead to identify the account. By using a token as a substitute for an account identifier, the risk of comprising real account information can be mitigated. In some embodiments, a token may be "format preserving" and may have a numeric format that conforms to the account identifiers used in existing payment processing networks (e.g., ISO 8583 financial transaction message format). In some embodiments, a token may be used in place of a PAN to initiate, authorize, settle or resolve a payment transaction. The token may also be used to represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "user device" may be a device that is operated by a user. Examples of user devices may include a mobile phone, a smart phone, a personal digital assistant (PDA), a laptop computer, a desktop computer, a server computer, a vehicle such as an automobile, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. There are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network.

DETAILED DESCRIPTION

In accordance with at least some embodiments, the disclosure is directed to a method and methods, systems, and apparatuses configured to generate a secure message. In some embodiments, the secure message may be a message used to initiate authorization for access to a resource. In some embodiments, the secure message may be generated by a user device that has received multiple encryption keys associated with multiple computing entities. The secure message may be generated upon receiving transaction data from a local device. The generated secure message may be transmitted to the multiple computing entities in series or in parallel.

In conventional systems, each message recipient may maintain a secure channel only with the recipient before and after it within a forwarding chain. These systems require that each entity decrypt the received message using a first shared secret, read the message, re-encrypt the message using a second shared secret, and forward the message to the next entity. This is repeated until the message reaches its final destination.

In some embodiments of the current disclosure, a single message may involve the use of multiple secure channels to communicate the message to various entities to which the message is targeted. For example, the user device may generate a shared secret between the user device and each of the message recipients (e.g., via a Diffie-Hellman key exchange) in order to establish a secure channel to be used in communicating with each of those entities. In some embodiments, the shared secret associated with each of the various entities may be used to secure a portion of a message targeted at that entity. In this way, the message may be broadcast to a number of different entities in parallel and each of the recipients is only able to read the portion of the message targeted at that recipient.

I. System Architecture

FIG. 1 depicts an example system architecture capable of implementing at least some embodiments of the disclosure. In FIG. 1, a user device 102 is depicted in communication with multiple computing entities via a communication network 104. In particular, the user device 102 may be in communication with a processing server 106, and/or an authorization computer 108. Additionally, a local device 110 may be in communication with an access server 112. The access server may be in communication with the authorization computer 108 via a processing network 114.

In accordance with at least some embodiments, the user device 102 may receive a first encryption key (or set of encryption keys) associated with a first computing entity (e.g., the authorization computer 108, the processing network 114, and/or the processing server 106). The first encryption key may be received via the communication network 104. The user device may, at a later time, receive a second encryption key (or set of encryption keys) associated with a second computing entity (e.g., the access server 112 and/or the local device 110). In some cases, the second encryption key may be received via the communication network 104. However, in other cases, the user device 102 may not have access to the communication network 104, and may receive the second encryption key from a local source (e.g., the local device 110 or a machine-readable code). Upon receiving an indication that a secure communication should be generated to one or more of the computing entities, the user device 102 may generate the secure message using an encryption key associated with each of the computing entities that are intended recipients of the secure message.

In accordance with at least some embodiments, the user device 102 may be any mobile computing device capable of implementing at least one of the disclosed embodiments. In at least some embodiments, the user device 102 may include at least one memory 116 and one or more processing units (or processor(s)) 118. The processor(s) 118 may be implemented as appropriate in hardware, computer-executable instructions, firmware or combinations thereof. Computer-executable instruction or firmware embodiments of the processor(s) 118 may include computer-executable or machine executable instructions written in any suitable programming language to perform the various functions described.

The memory 116 of user device 102 may include a secure execution environment such as a secure memory (e.g., Smartcard based technology available in low-power devices). In some embodiments, the secure memory may include a secure element. A secure element (SE) can be a tamper-resistant platform (typically a one chip secure microcontroller) capable of securely hosting applications and their confidential and cryptographic data (e.g. encryption key management) in accordance with the rules and security requirements set forth by a set of well-identified trusted authorities.

Encryption key and/or encryption protocol information provisioned onto the user device 102 may be stored in the secure memory. The user device 102 may include secure key storage to protect data at rest and encryption keys (i.e. a shared secret). The encryption keys could be unique-derived keys (UDKs), which can be derived from user account information and other unique information. A benefit to using UDKs is that the UDKs do not need to be transported to the devices that use them, but they can be generated by those devices using information known to those devices. The user device 102 may also store instructions for communicating with other devices and/or instructions for initiating an authentication request, as may occur for a transaction (e.g., a payment transaction).

Turning to the contents of the memory 116 in more detail, the memory 116 may include an operating system 122 and one or more application programs or services for implementing the features disclosed herein including at least a module for assessing authorization requests received from a local device 110 and generating a secure communication (authorization module 124) and/or a module for managing encryption keys and encrypting at least a portion of a message (encryption module 126). The memory 116 may also include encryption data 128, which provides data associated with one or more encryption keys/encryption protocols and access credential data to be used in the transaction request.

In some embodiments, the authorization module 124 may, in conjunction with the processor 118, be configured to generate an authorization request based on data received from a local device 110. For example, the user device may receive an indication of a particular transaction to be completed using the user device. In this example, the authorization module 124 may be configured to cause the processor 118 to identify an access credential (e.g., a token or other account information) to be used to complete the transaction. The authorization module 124 may be configured to cause the processor 118 to determine whether the transaction is in compliance with one or more policies or protocols associated with electronic transactions. Upon determining that the transaction is in compliance with the one or more policies or protocols, a transaction message may be generated that includes the access credential and an indication that the transaction is to be initiated. In some embodiments, the transaction message may comprise an authorization request message to be provided to an authorization computer 108.

In some embodiments, the encryption module 126 may, in conjunction with the processor 118, be configured to encrypt at least a portion of the generated transaction message using a specified encryption key and/or encryption protocol. In some embodiments, the encryption module 126 may identify a number of computing entities that are to receive the transaction message. Upon identifying these computing entities, the encryption module 126 may cause the processors 118 to query the encryption data 128 to identify encryption keys and/or encryption protocols associated with those computing entities. The encryption module 126 may further cause the processors 118 to determine what subset of data included in the transaction message is relevant and/or necessary to each of the identified computing entities. A secure message may be generated by encrypting the subset of data relevant to each computing entity using an encryption key relevant to that computing entity. Each encrypted subset of data may then be compiled into a secure message. In some embodiments, a header may be generated to identify a location of each encrypted subset of data.

The user device 102 may also contain communications interface(s) 130 that enable the user device 102 to communicate with a stored database, another computing device or server, one or more terminal devices, connected devices, and/or other electronic devices on a network. Examples of communication interface 130 may include one or more radio frequency (RF) transceivers configured to send and receive communications using near-field communications (NFC), or other radio frequency or wireless communication protocols such as Bluetooth, Bluetooth low-energy (BLE), a wireless local area network (e.g., WiFi), iBeacon, etc. In some embodiments, communication interface 130 may include an infrared communication device. In some embodiments, the communication interface 130 may include both long range and short range communication means. For example, the communication interface may include an antenna configured to connect to a cellular network in order to enable communication with various other components of the depicted architecture. Additionally, the communication interfaces may include short range communication means for establishing a short range communication session with a local device 110. In some embodiments, the communication interface 130 may be a scanning device capable of interpreting machine readable code. For example, the communication interface 130 may be a barcode scanner capable of scanning a barcode. In this example, the communication interface 130 may be used to scan a barcode that includes an encryption key to be used in a transaction.

The user device 102 may also include input/output (I/O) device(s) and/or ports 132, such as for enabling connection with a keyboard, a mouse, a pen, a voice input device, a touch input device, a display, speakers, a printer, etc.

In some examples, the communication network 104 and/or the processing network 114 may include any one or a combination of many different types of networks, such as cable networks, the Internet, wireless networks, cellular networks, and other private and/or public networks. In addition, the communication network 104 and/or transaction processing network 114 may comprise multiple different networks. For example, the user device 102 may utilize a 3G network to communicate with a wireless router, which may then route the communication over a public network (e.g., the Internet) to the processing server 106. In some embodiments, the processing network 114 may be a payment processing network (e.g., VisaNet).

In accordance with at least some embodiments, the processing server 106 may be any computing device, including a remotely located server computer, configured to perform one or more actions on behalf of the user device 102. Additionally, it should be noted that in some embodiments, the processing server 106 may be embodied by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment. In some embodiments, the processing server 106 may be configured to provision information onto the user device 102. The processing server may provide any suitable service and/or processing for the user device 102. In some embodiments, the processing server may maintain an account for one or more users. The processing server may also store one or more protocols and/or user preferences related to the operation of the user device 102 or service.

In accordance with at least some embodiments, the authorization computer 108 may be any computing device or plurality of computing devices configured to receive an authorization request message for a transaction, authorize or decline the transaction, and provide an authorization response message based on whether the transaction has been authorized or declined. The authorization computer 108 may determine whether to authorize or decline the transaction based on information associated with the transaction. In some embodiments, the authorization computer 108 may be an issuer of a payment account (e.g., a credit card).

In accordance with at least some embodiments, the local device 110 may be any device capable of providing transaction details and/or encryption key information to a user device via a local communication channel. In some embodiments, the local device 110 may be an access device in communication with a point of sale terminal (e.g., a cash register). In some embodiments, the local device 110 may be a beacon or WiFi transmitter. The local device 110 may transmit a public encryption key to a user device 102 that enters within communication range of the local device. In some embodiments, the local device may comprise an electronic device capable of short range communication.

In accordance with at least some embodiments, the access server 112 may be any computing device or plurality of computing devices configured to provide access to a resource. In some embodiments, the access server 112 may be associated with an electronic commerce site. For example, the access server 112 may maintain a catalog of items and/or services available for purchase by a user. The access server 112 may also be associated with a merchant website or an acquirer. In some embodiments, the access server 112 may enable a user to gain entry to a secure area or storage unit. The access server 112 may also be configured to complete a transaction upon receiving an authorization response message indicating that a transaction has been approved.

The access server 112 may manage access to a resource 113. The resource 113 may be a good or service, a physical building, a computer account or file, or a payment account. The user may access the resource 113 directly or by using a user device 102 (e.g., a mobile device or a computer). Access to the resource 113 may be granted or denied by an access server 112. The access server 112 may comprise the resource 113 or the resource 113 may be separate from the access server 112. For example, where the resource 113 is access to a building, the access server 112 may be integrated into the building or a door of the building and the access server 112 may grant a user access to the resource 113 by unlocking the door. In another example, the resource 113 is a computer account or file, the access server 112 comprises the computer account or file (i.e., the resource), and the access server 112 may grant access to the user device 102 of the user.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communications protocol.

II. Secure Communication Generation

The components depicted in the above example architecture (set forth in FIG. 1) may be configured to interact in a number of ways to generate a secure message in accordance with this disclosure. Described below (FIG. 2) is one such exemplary process flow for generating a secure message. Additionally, an example format of a secure message generated using this exemplary process flow is depicted in FIG. 3.

A. User Device Receipt of Encryption Keys and Transmission of Message

Figure 2:
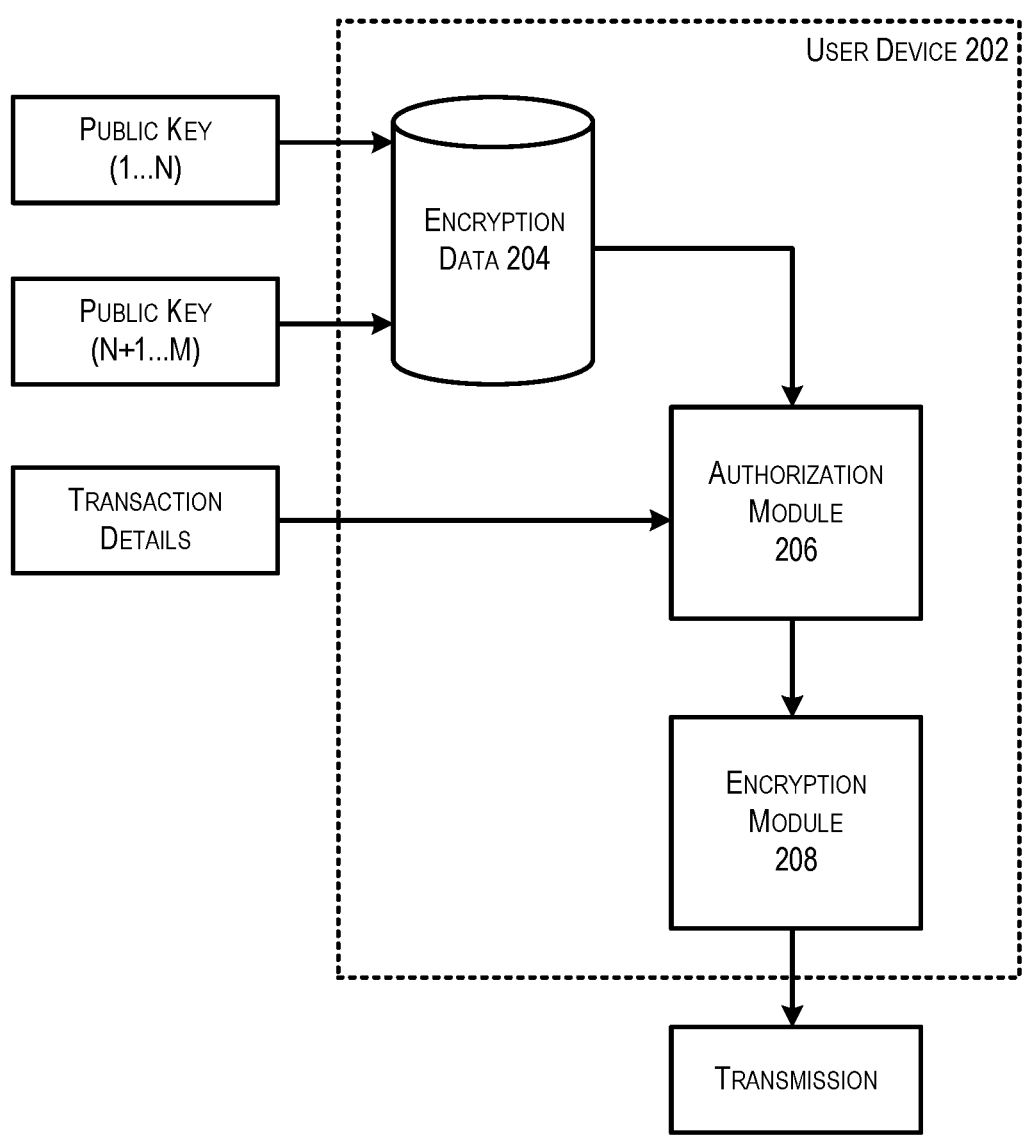
FIG. 2 depicts an example data flow that may be implemented to generate a secure communication in accordance with at least some embodiments.
Figure 3:
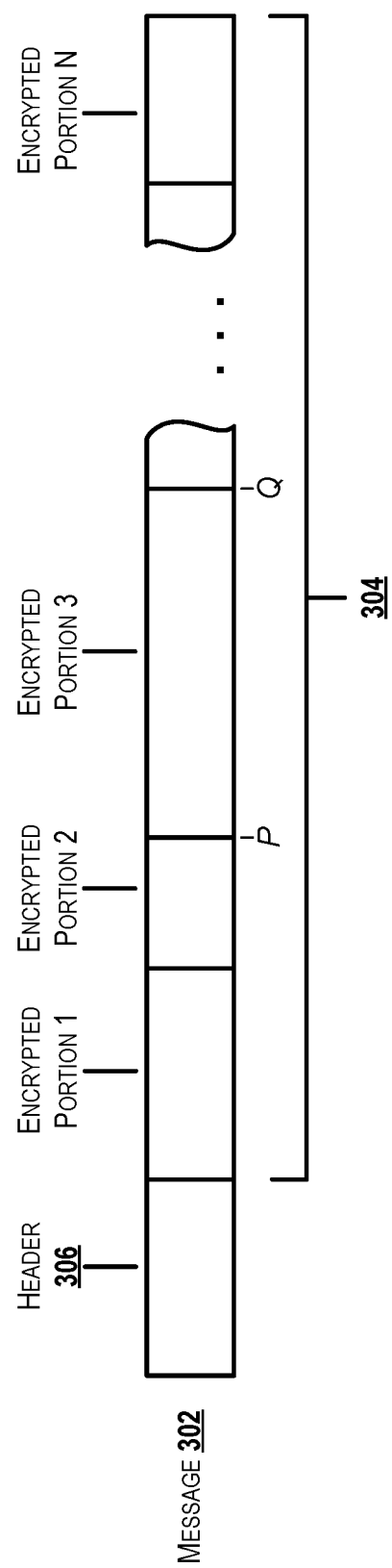
FIG. 3 depicts an example secure message that may be generated using at least some embodiments of the disclosure.

FIG. 2 depicts an example data flow that may be implemented to generate a secure communication in accordance with at least some embodiments. In FIG. 2, a process is described in which a user device 202 may receive multiple encryption keys, generate a secure message using the one or more encryption keys, and transmit the generated secure message to one or more computing entities.

In FIG. 2, one or more public encryption keys (1 . . . N) may be provisioned onto a user device 202 and stored in an encryption database 204. In some embodiments, this may be done upon enrollment of the user device with an authorization computer and/or processing computer (e.g., an authorization computer 108 and/or the processing computer 106 as depicted in FIG. 1). The public keys 1-N may be public encryption keys to be used in securing communications directed to one or more computing entities. For example, upon enrollment of a user device 202 with an authorization computer, the user device 202 may be provisioned with one or more encryption keys that may be used to secure messages provided to that authorization computer. In some embodiments, the user device 202 may be provisioned with a set of information relevant to each computing entity. For example, the authorization computer may provide a list of transaction details that are needed in an authorization request message in order to process a transaction.

In accordance with at least some embodiments, the user device 202 may be provided with one or more additional public keys (N+1 . . . M) by a computing entity (e.g., the local device 110 depicted in FIG. 1) with which the user device is to make an authorization request. In some embodiments, the user device 202 may receive the one or more additional public keys from an access device of a point of sale terminal. For example, the access device may transmit the one or more additional public keys to the user device via a short range communication mechanism (e.g., Bluetooth, WiFi, etc.). In some embodiments, the public keys may be provided (e.g., via push notification) to any user device entering a geographic vicinity or within range of a wireless transmitter (e.g., a beacon or wireless router). In some embodiments, the public keys may be obtained by the use of a scanning device attached to the user device 202. For example, a user may use a scanning device of the user device 202 to scan a machine readable code (e.g., a barcode, quick response (QR) code, etc.). One or more public encryption keys may be embedded in the machine readable code. In some embodiments, the user device 202 may also be provided with a second set of information relevant to each computing entity. For example, an access server may provide a list of transaction details that are needed in a transaction request in order to initiate a transaction.

Once the user device 202 has been provided with multiple public encryption keys (e.g., a public key associated with an authorization computer and a public key associated with an access server), it may receive authorization details relevant to a secure message to be generated by the user device. In some embodiments, the received authorization details may be processed according to instructions stored as an authorization module 206 and executed by one or more processors. The authorization module 206 may include instructions that cause the one or more processors to identify transaction details needed to complete a transaction and normalize those details to generate a transaction request. The authorization module 206 may include instructions that cause the one or more processors to identify one or more computing entity recipients of a secure message to be generated. The instructions may also cause the one or more processors to determine one or more pieces of data to be provided to each potential computing entity listed as a recipient of a secure message. In some embodiments, the data to be provided to each computing entity may be determine from a list of transaction details provided by that computing entity. In some embodiments, the data to be provided to each computing entity may be predetermined and/or pre-programmed for each computing entity recipient based on the type or role of that computing entity. For example, the user device 202 may be provisioned with a list of transaction details to be provided to each computing entity fulfilling a specific role within the transaction.

Once the computing entity recipients have been determined, as well as the data to be provided to each of the computing entity recipients, a secure message may be generated in accordance with a set of instructions stored as an encryption module 208. The encryption module 208 may include instructions that cause the one or more processors to identify, for each computing entity recipient identified, the data to be provided to that entity and a public key to be used to encrypt that data. The identified data may be encrypted using the identified public key and appended to a secure message. In some embodiments, this may be repeated for each identified computing entity recipient of the secure message. In some embodiments, the secure message may include an indication of each computing entity recipient (e.g., a uniform resource locator (URL) for that recipient) and a location of the data within the secure message intended for that recipient. In some embodiments, this indication may be included in a header of the secure message. In some embodiments, each of the encrypted portions of the message intended for different computing entities may be indicated as such. This will be described in greater detail below with respect to FIG. 3.

Once the secure message has been generated, it may be transmitted to each of the recipient computing entities. In some embodiments, the secure message may be transmitted to a local device via a short range communication mechanism, from which it may be forwarded to each of the recipient computing entities. In some embodiments, the user device may transmit the message to each of the computing entity recipients in parallel. This will be described in greater detail below with respect to FIG. 4 and FIG. 5.

B. Format of Message

FIG. 3 depicts an example secure message that may be generated using at least some embodiments of the disclosure. The secure message depicted in FIG. 3 may be generated using at least the process illustrated by the data flow depicted in FIG. 2.

In accordance with at least some embodiments of the disclosure, a message 302 may be generated to include multiple encrypted portions of data 304. As depicted, the message 302 may include N encrypted portions of data, where N corresponds to the number of computing entity recipients for the message 302, such that each encrypted portion of data is intended for a target computing entity. Each encrypted portion of the message 302 may include a cipher text version of a subset of data needed by the target computing entity to fulfill its role within the transaction. In some embodiments, the subset of data may be formatted according to format requirements specific to the target computing entity. For example, the user device may be provisioned with a format specification associated with a particular computing entity such that any data provided to that computing entity will be formatted according to the provisioned format specification. For instance, an access server (i.e., the access server 112 of FIG. 1) may require that data be provided in a different format than an authorization computer (i.e., the authorization computer 108 of FIG. 1). In this example, the subset of data encoded to be provided to the access server may be formatted according to a format specification received in relation to the access server whereas the subset of data encoded to be provided to the authorization computer may be formatted according to a format specification received in relation to the authorization computer.

In some embodiments, one or more computing entity recipient may fulfill multiple roles. In these embodiments, the message may contain separate encrypted portions for each role associated with the computing entity, or it may contain a single encrypted portion for that computing entity that includes all of the data needed for each role. For example, a processing network may also act as an authorization computer. In this example, a message that includes the recipient computing entity as both the processing network and authorization computer may include a separate encrypted portion for each of the roles or it may include a single encrypted portion that includes all of the data to be consumed by that computing entity.

In accordance with at least some embodiments, a secure message may include multiple encrypted portions of data 304 that are each encrypted using different encryption keys. Each of the depicted encrypted portions of data 1-N may include a subset of transaction data encrypted so that the respective subset of data within the encrypted portion may only be accessed by the recipient computing entity with which it is associated. In some embodiments, the data included in each subset of data may be determined based on transaction details needed by the target computing entity to which an encrypted portion is to be provided. The data included in different subsets of data may overlap. For example, one or more pieces of transaction data may be included in multiple subsets of data, such that it is provided to multiple target computing entities.

In some embodiments, each of the subsets of data, and hence each of the encrypted portions, may be of a different size or length. An indication of the position (e.g., a character location) of each encrypted portion and/or an indication of a computing entity recipient may be stored in an index. For example, in some embodiments of the disclosure, a header 306 may be appended to each message 302 that indicates each recipient computing entity and a location of the encrypted portion intended for that recipient computing entity. In some embodiments, an indication of the public key used to encrypt the encrypted portion may also be stored in the header 306. In some embodiments, the header may include an address or identifier for each of the recipient computing entities (e.g., a URL for each recipient computing entity).

In some embodiments, a particular segment of the message 302 may be reserved for an encrypted portion associated with computing entity performing a particular role. For example, character P through character Q may be reserved for a computing entity performing the role of authorization computer, where P and Q are both predetermined character positions. In this example, each time that a message 302 is generated, characters P through Q will be dedicated to the encrypted portion to be provided to the authorization computer.

III. Secure Communication Transmission

In current secure message systems, a secure message is typically disseminated using a serial forwarding dissemination process. In this process, upon receipt of the message, the message may be decrypted and read by a recipient computing entity. In some cases, the message (or a portion thereof) may then be forwarded to the next computing entity on the recipient list. In some cases, the message may be re-encrypted using an encryption key specific to the next computing entity on the recipient list and then forwarded to that entity. This means that each computing entity on the recipient list is able to access all of the data within the message, some of which is not needed by that computing entity. In this system, each computing entity on the recipient list represents an increased risk for interception by an unauthorized third party entity.

As depicted in FIG. 3 above, messages generated in accordance with the disclosure may include separately encrypted portions of data, such that each encrypted portion may only be accessed by its intended recipient computing entity. Furthermore, each of the encrypted portions of data may be accessed independently, or without interaction with, any other computing entity. Accordingly, these secure messages may be disseminated to each of the recipient computing entities in a number of ways, some of which may not be feasible with traditional secure messages. Some non-limiting examples of dissemination techniques are described with respect to FIG. 4 and FIG. 5 below.

A. Serial Forwarding

Figure 4:
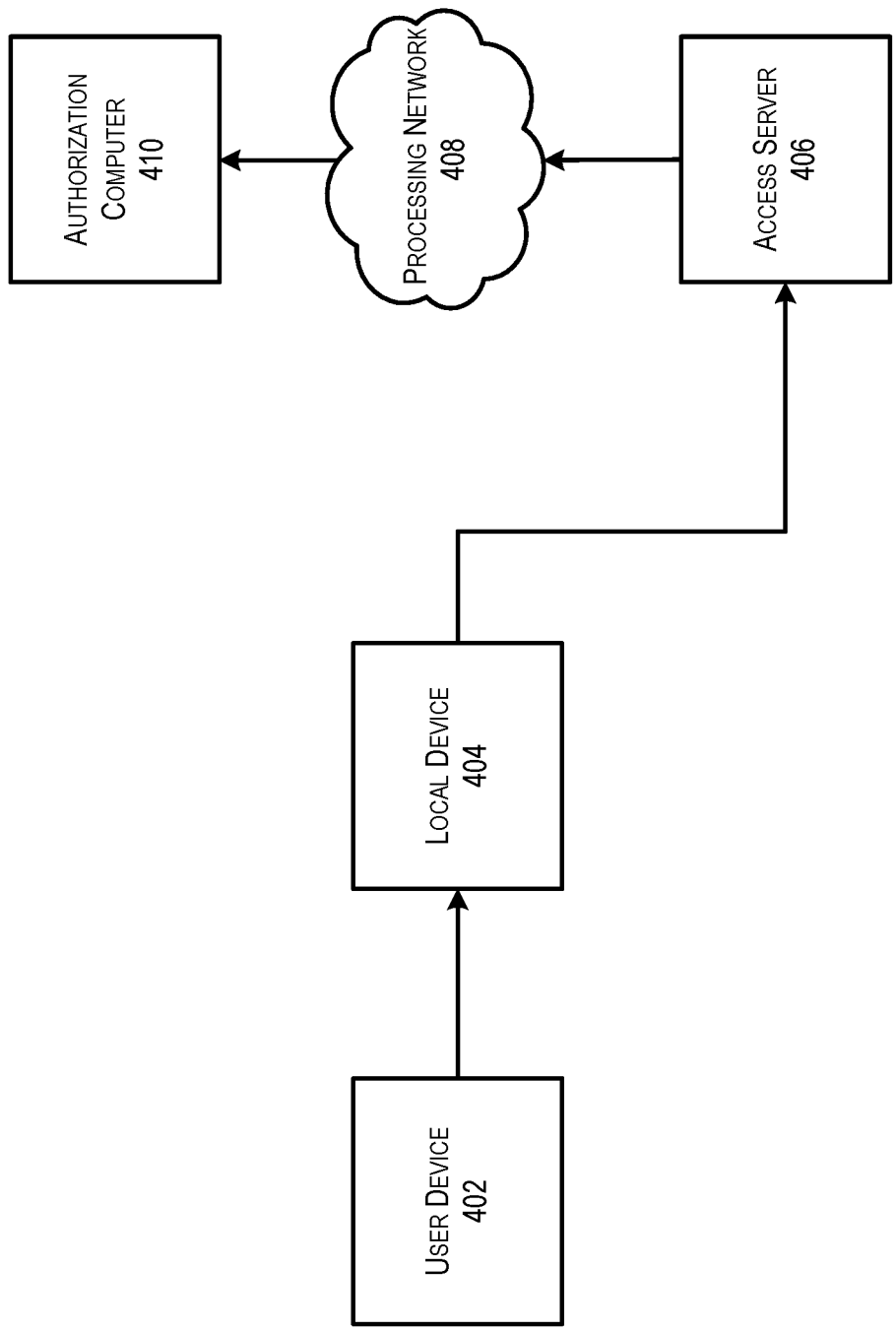
FIG. 4 depicts a first method of disseminating a secure message generated using at least some embodiments.

FIG. 4 depicts a first method of disseminating a secure message generated using at least some embodiments of the disclosure. In FIG. 4, a user device 402 may transmit a secure message to a local device 404. The local device 404 may then forward the secure message to one or more recipient computing entities. As depicted in FIG. 4, the secure message may be transmitted in serial. For example, the secure message may be transmitted (e.g., via a network connection) to an access server 406. The access server, in turn, may read an encrypted portion of the secure message relevant to the access server and may then forward the secure message to a processing network 408. Upon receiving the secure message, the processing network 408 may read an encrypted portion of the secure message relevant to the processing network and may forward the request to the authorization computer 410. In some embodiments, the recipient list may be embedded in a header for the secure message. For example, a current computing entity may identify the next recipient computing entity based on that recipient computing entity following the current computing entity in a list provided in the header of the secure message.

In accordance with at least some embodiments, the user device 402 may transmit the message directly to the access server 406 without first relaying the message to the local device 404. For example, the user device 402 may receive transaction details from the local device 404, generate a secure message using at least one embodiment of the disclosure, and may subsequently provide the generated secure message directly to the access server 506 (e.g., via a wireless network connection).

B. Parallel Forwarding

Figure 5:
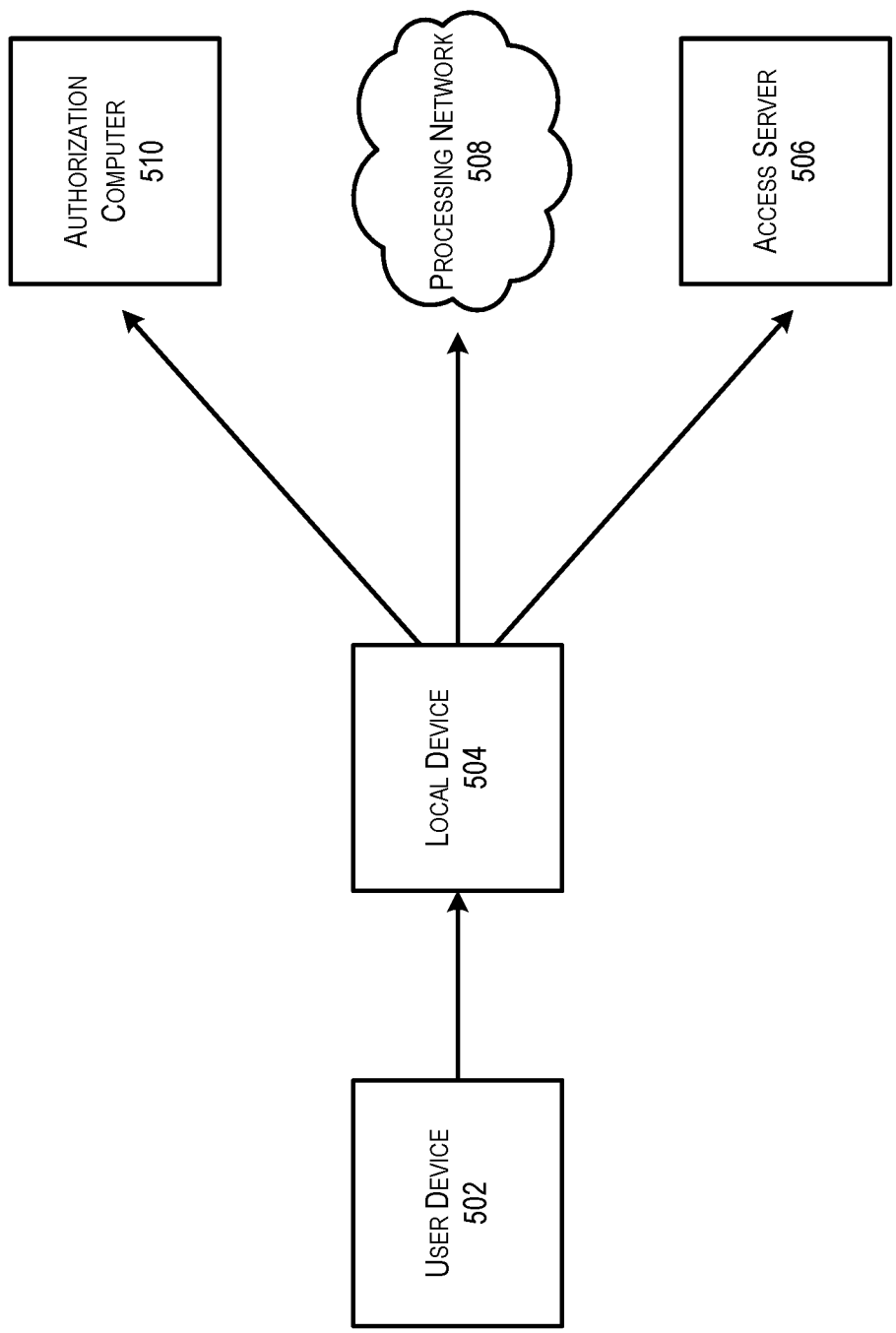
FIG. 5 depicts a second method of disseminating a secure message generated using at least some embodiments.

FIG. 5 depicts a second method of disseminating a secure message generated using at least some embodiments of the disclosure. In conventional communication forwarding, a secure message is forwarded to the next computing entity in the chain of recipients. In these systems, an entire message may be encrypted so that it may be accessed by only a specific computing entity. The message may be decrypted by that computing entity and subsequently re-encrypted so that it may be accessed by only the next recipient computing entity to receive it. Accordingly, conventional systems are incapable of implementing the method of disseminating a secure message depicted in FIG. 5.

In accordance with at least some embodiments of the disclosure, the message includes portions of data that are each intended for a specific computing entity and may be accessed independently by that computing entity. Accordingly, the secure message of the disclosure need not be forwarded using serial forwarding, as is required of most current secure message dissemination systems. Instead, the secure message may be provided to each of the intended recipients in parallel. This results in a system that is more dependable (e.g., has less risk of failure) as the secure message will still be received by entities downstream from an offline computing entity.

Additionally, because the secure message may be sent to each of the entities in parallel, embodiments of the current disclosure can enable the use of multiple secure channels. This may be used to ensure that even if one of the parties is compromised, the message intended for entities other than that entity remains secure. Because each entity is provided a different set of data, the use of multiple secure channels also ensures that an unauthorized party that compromises an entity does not receive the entire set of information.

As depicted, a secure message may be provided by a user device 502 to a local device 504. The secure message may then be disseminated to multiple recipients of the list of recipient computing entities in parallel (e.g., at substantially the same time). Each of the recipient computing entities is then able to access its relevant encrypted portion in order to assess the transaction to which the secure message is related. For example, the user device 502 may receive transaction details related to a transaction to be completed between a local device 504 and the user device 502. In this example, the user device 502 may generate a secure transaction request message in accordance with the disclosure, and may provide the generated secure message to the local device 504 to complete the transaction. The local device 504 may then transmit the message to each of the access server 506, processing network 508, and/or authorization computer 510 in parallel. In some embodiments, the local device may identify a full set of recipient computing entities from a recipient list embedded in a header of the secure message.

In accordance with at least some embodiments, the user device may transmit the message directly to one or more of the other computing entities. For example, upon generating the secure message, the user device may transmit the message to each of the access server 506, processing network 508, and/or authorization computer 510 without first relaying the message to the local device 504. In some embodiments, this may involve creating secure channels between the user device and each of the other computing entities. For example, this may involve generating a shared secret between the user device and the other computing entity (e.g., via a Diffie-Hellman key exchange) in order to establish a secure channel to be used in communicating with that entity (e.g., by generating a symmetric encryption key). In another example, this may involve obtaining one of a pair of encryption keys (e.g., a public key) associated with each of the entities to be provided in a message. Once obtained, each portion of the message intended for a particular entity may be encrypted using its respective encryption key.

In some embodiments, the secure message may be disseminated with a mix of parallel and serial forwarding. For example, the secure message may be provided in parallel to an access server, a processing network, and a token server. The token server may subsequently identify a payment mechanism and a corresponding issuer associated with a token used in the transaction, and may subsequently forward the secure message to the issuer for authorization.

IV. Implementation for Authorization

The techniques described in this disclosure may be used to secure any suitable type of communication. For example, a user device may use the described disclosure to generate a secure communication to an access server to gain entry to a secure area or storage. In another example, a user device may use the described disclosure to generate a secure communication to a resource provider to initiate a transaction to obtain the resource. As would be recognized by one skilled in the art, there are a number of types of communication that would benefit from implementations of the current disclosure. For each type of communication, a system to generate a secure communication in accordance with the disclosure may be implemented in a similar manner. A process for preparing a user device and resource provider for implementation of at least some embodiments of the disclosure is described with respect to FIG. 6 below. Additionally, a process for generating and transmitting a secure message using a user device in accordance with at least some embodiments is described with respect to FIG. 7 below.

A. Sequence Diagram

Figure 6:
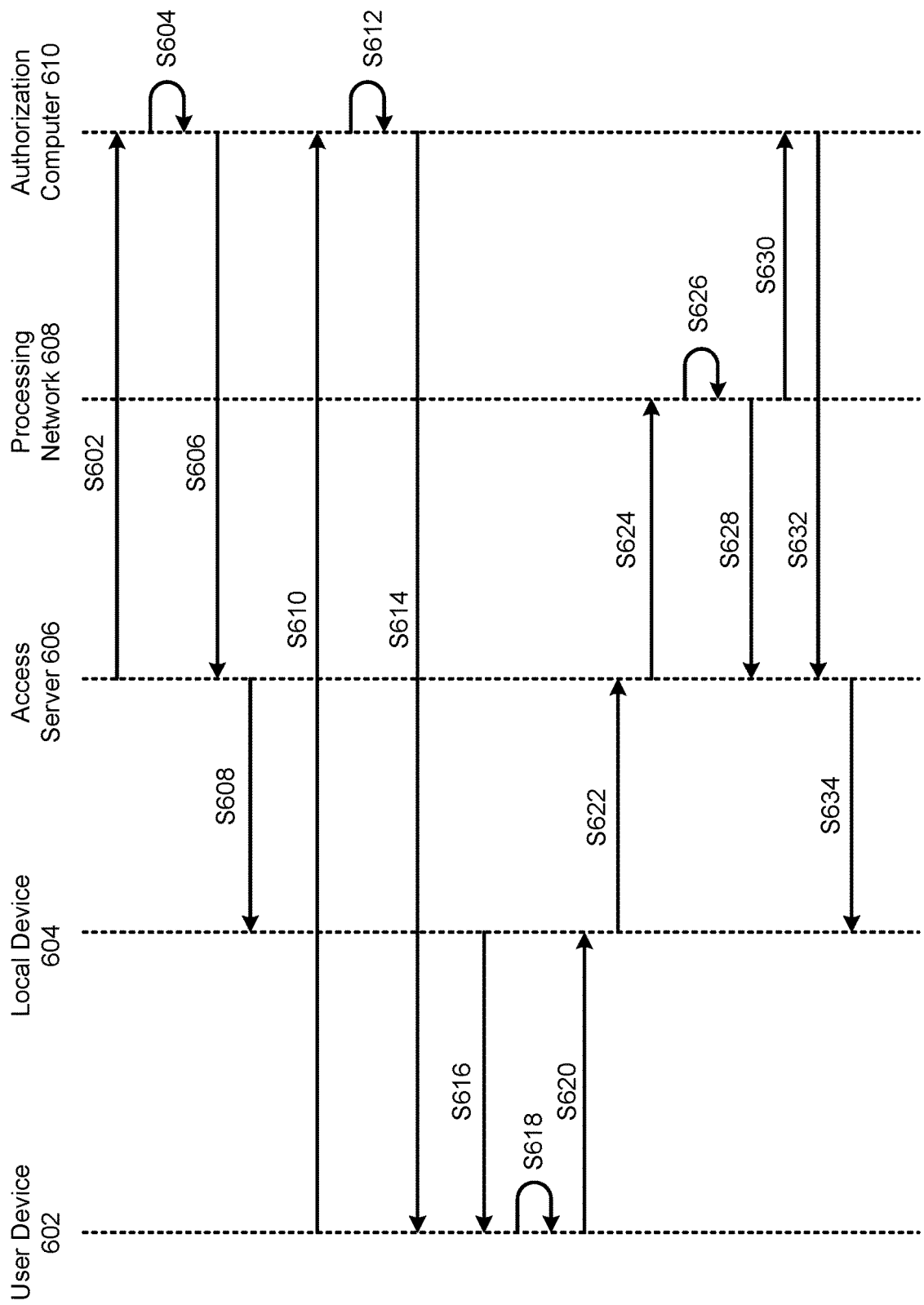
FIG. 6 depicts a process for preparing a user device and resource provider for implementation of at least some embodiments of the disclosure.

FIG. 6 depicts a process for preparing a user device and resource provider for implementation of at least some embodiments of the disclosure. In accordance with at least one embodiment, the process 600 of FIG. 6 may be performed by at least the user device 102 depicted in FIG. 1.

Some or all of any of the processes described herein (or variations and/or combinations thereof) may be performed under the control of one or more computer systems configured with executable instructions and may be implemented as code (e.g., executable instructions, one or more computer programs or one or more applications). The code may be stored on a computer-readable storage medium, for example, in the form of a computer program including a plurality of instructions executable by one or more processors. The computer-readable storage medium may be non-transitory.

FIG. 6 depicts one or more interactions between a user device 602, a local device 604, an access server 606, a processing network 608, and an authorization computer 610. In particular, depicted is a process 600 for enrolling a resource provider by provisioning an access server and/or local device with instructions to implement at least some embodiments of the disclosure. The process 600 also depicts enrollment of a user device 602 by provisioning the user device 602 with a public key and instructions for implementing at least some embodiments of the disclosure. The process 600 also depicts an authorization transaction conducted between the resource provider and the user device 602 in accordance with at least some embodiments.

Process 600 may begin at S602, when an access server 606 associated with a resource provider requests enrollment with a processing network 608 or an authorization computer 610 in order to receive instructions for implementing at least some embodiments of the disclosure. In some embodiments, the request may be a request to download instructions for implementing the disclosure. The request may include an identifier for the access server 606.

At S604, the processing network 608 or the authorization computer 610 may store enrollment information associated with the access server 606 in a database of resource providers. A set of computer executable instructions that may be executed by the access server 606 and/or local device 604 may be identified to be provided to the access server 606.

At S606, the authorization computer 610 or processing network 608 may provide the identified set of computer executable instructions to the access server 606 to be installed and/or executed on the access server. In accordance with at least some embodiments, the computer executable instructions may include instructions configured to cause the access server to receive and interpret messages generated in accordance with this disclosure. In addition, the set of computer executable instructions provided to the access server 606 may cause the access server to provide an encryption key to one or more user devices 602.

At S608, the access server 606 may provision one or more local devices 604 with computer executable instructions configured to cause the one or more local devices to communicate at least one encryption key associated with the access server 606 to a user device 602. For example, a point of sale device (a local device 604) may be provisioned with an encryption key and instructions to provide the encryption key to a user device 602 that may come within range (e.g., within communication distance of a short range communication mechanism) of the point of sale device.

At S610, a user device 602 requests enrollment with a processing network 608 or an authorization computer 610 in order to receive instructions for implementing at least some embodiments of the disclosure. In some embodiments, the request may be a request to download instructions for generating a secure message in accordance with the disclosure. The request may include an identifier for the user device 602.

At S612, the processing network 608 or the authorization computer 610 may store enrollment information associated with the user device 602 in a database of enrolled devices. A set of computer executable instructions that may be executed by the user device 602 may be identified to be provided to the user device 602. In some embodiments, a token or other access credential may be generated to be provisioned onto the user device 602.

At S614, the authorization computer 610 or processing network 608 may provide the identified set of computer executable instructions to the user device 602 to be installed and/or executed on the access server. In accordance with at least some embodiments, the computer executable instructions may include instructions configured to cause the user device 602 to receive encryption keys from multiple sources and generate a secure message in accordance with this disclosure. In at least some embodiments, the user device 602 may receive the authorization module (e.g., an example authorization module 206 as depicted in FIG. 2) and/or the encryption module (e.g., an example encryption module 208 as depicted in FIG. 2) to be installed on the user device 602. The user device 602 may also be provisioned with a first set of encryption keys associated with the processing network 608 and/or an authorization computer 610.

At S616, the user device 602 may receive a second set of encryption keys associated with a local device 604 and/or an access server 606. In some embodiments, the second set of encryption keys may be transmitted to the user device 602 by the local device 604 via a short range communication mechanism. In some embodiments, the local device 604 may be configured to display a machine readable code embedded with an encryption key, such that, when scanned by the user device 602, the user device 602 is able to read the encryption key. The local device may transmit one or more details associated with a communication to be generated to the user device 602. For example, the local device 604 may be a point of sale device for a resource provider. In this example, the point of sale device may receive an indication of one or more resources (e.g., goods and/or services) desired by a user of the user device 602. Details related to an acquisition of the resources may be provided to the user device 602 so that a transaction for the resources may be conducted. In another example, the local device 604 may be a computer. For example, the local device 604 may be a person's home computer. In this example, the user device 602 may be provided with an encryption key upon entering within communication range of the home computer. In some embodiments, the user device 602 may generate a secure message and may subsequently reply to the home computer with the secure message. The home computer may, upon receiving (and potentially decrypting) the secure message, unlock or enable its use.

In another example, the local device 604 may be an electronic locking device, badge reader, or other suitable access control mechanism associated with a secure area or storage. In this example, the access control mechanism may receive an indication that access to the secure area is being requested by a user of a user device 602. Details related to access of the secure area may be provided to the user device 602 so that the user device may generate a secure request for authorization to enter the secure area.

In some embodiments of the disclosure, a local device 604 may comprise a system that manages encryption keys and pushes those encryption keys to user devices 602 that request authorization. In some embodiments, the local device 604 may push one or more encryption keys to each user device 602 that enters within a geographic region. For example, the local device 604 may provide an encryption key to a user device 602 automatically as it comes within range of a short range communication mechanism communicatively coupled to the local device 604. The local device 604 may also comprise a mechanism for handling another portion of the authentication process. For example, in addition to pushing an encryption key to the user device 602, the local device 604 may also control a locking mechanism for a secure area. In this example, the local device 604 may provide an encryption key to the user device 602 and may subsequently receive authorization from an access server 606. Upon receiving the authorization, the local device 604 may unlock the locking mechanism.

At S618, the user device 602, upon receiving details related to a communication to be generated by the user device 602, the user device 602 may generate a secure message to initiate completion of the transaction. In some embodiments, the user device 602 may perform the process 200 depicted in FIG. 2 to generate a secure message in accordance with the disclosure.

At S620, the user device 602 may transmit the secure message to one or more computing entity recipients. In some embodiments, the user device 602 may transmit the secure message to the local device 604 (e.g., via a short range communication mechanism). Embodiments of this disclosure enable a secure message to be communicated to multiple entities even in cases in which the user device 602 is offline (e.g., without connectivity to one or more networks). For example, the user device 602 may be configured to display a machine readable code (e.g., a QR code) to a local device 604 in order to transmit the secure message. The local device 604 may be configured to read the machine readable code to obtain the secure message and forward the message to one or more recipient computing entities. In some embodiments, the secure message may be provided by the user device 602 to the access server 606.

At S622, the local device 604 may forward the secure message to the access server 606. In some embodiments, the local device 604 may read a portion of the secure message to obtain one or more details related to the user device 602.

At S624, the access server 606 may read a portion of the secure message intended for the access server 606. The access server 606 may identify a processing network 608 and forward the secure message to that processing network 608. In some embodiments, the access server 606 may identify the processing network 608 from a list of recipient computing entities included with the secure message (e.g., in a header of the secure message). In some embodiments, the access server 606 may optionally send a challenge/response to the processing network 608. The processing network 608 may determine, based on fraud and/or risk assessment rules, a preliminary authorization for the secure message.

At S626, the processing network 608 may read a portion of the secure message intended for the processing network 608. The processing network may identify an authorization computer associated with the secure message and forward the secure message to that authorization computer 610. In some embodiments, the processing network 608 may identify the authorization computer 610 from a list of recipient computing entities included with the secure message (e.g., in a header of the secure message).

At S628, the processing network 608 may optionally respond to the challenge/response sent by the access server 606 at S624. For example, the processing network 608 may determine that the secure message is not in compliance with one or more fraud and/or risk assessment rules. In this example, the processing network 608 may provide a response to the access server 606 that the transaction is to be declined.

At S630, the processing network 608 may forward the secure message to the authorization computer 610. Upon receiving the secure message, the authorization computer 610 may read an encrypted portion of the secure message intended for the authorization computer and may generate an authorization response message indicating whether the transaction is authorized or declined.

At S632, the authorization computer 610 may determine whether the transaction is authorized. In some embodiments, upon authorizing the transaction conveyed in the secure message, the authorization computer may generate a credential (e.g., a security certificate). The credential may be provided to the access server 606 and/or the user device 602. For example, upon receiving a request to gain entry to a secure area from a user device 602, the authorization computer 610 may, upon determining that access should be granted, provide a credential to the user device 602 that allows its user to gain entry to the secure area. In some embodiments, the credential may only be good for a limited time. In another example, the authorization computer 610 may generate a transaction identifier (i.e., the credential) to be provided to the access server 606 for future references to the transaction. The authorization response message may be transmitted to the access server 606 to complete the transaction.

At S634, the access server 606 may provide an indication to local device 604 about whether authorization is granted (e.g., whether the transaction is authorized or declined, whether access is to be granted to a secure area, whether a secure computer may be accessed, etc.). In some embodiments, the local device 604 may display an indication of the status of the transaction to a user of the local device 604. For example, the local device 604 may include a display device that can convey the status of the transaction as indicated by the authorization response message.

B. Generating a Secure Communication Using a User Device

Figure 7:
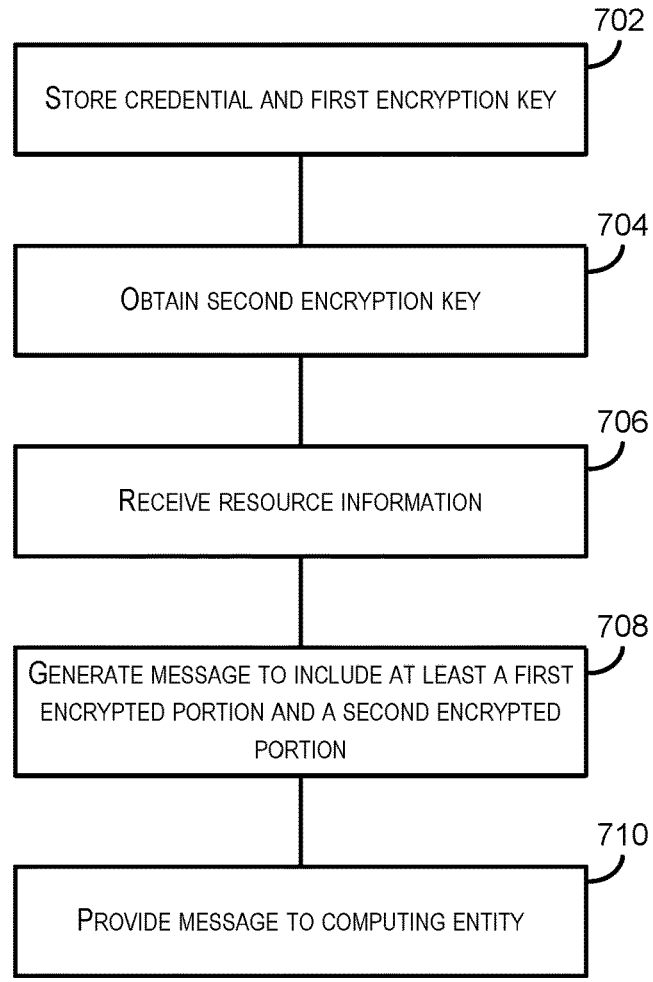
FIG. 7 depicts a process for generating and transmitting a secure message using a user device in accordance with at least some embodiments.

FIG. 7 depicts a process for generating and transmitting a secure message using a user device in accordance with at least some embodiments. In at least some embodiments, process 700 may be performed by user device 102 depicted in FIG. 1.

Process 700 may begin at 702, when at least one first encryption key is received and stored by a user device. In some embodiments, the user device may receive access credential information and a public encryption key associated with an issuer of the access credential information. For example, the user device may receive a token that can be used to complete transactions as well as an encryption key to be used in corresponding with a token server that maintains an account associated with the token. In this example, the token server may be a recipient computing entity to which a secure message will be provided. In some embodiments, the at least one first encryption key and/or the credential information may be provisioned onto the user device. For example, the token and encryption key in the example above may be provisioned onto the user device upon the user device's enrollment with a token service.

At 704, a second encryption key may be obtained. More than one second encryption key may be obtained. The second encryption key may be relevant to a computing entity with which the user device may conduct a transaction. As examples, the second encryption key may be an encryption key for a retailer, or other suitable provider of a resource.

The second encryption key may be received via a local communication interface. In some implementations, the local communication interface may include a scanning device capable of scanning a machine readable code (e.g., a barcode. QR code, etc.). In further implementations, the local communication interface may include a short-range wireless communication channel (e.g., Bluetooth, WiFi, infrared, etc.).

In some embodiments, a second encryption key may be provided to the user device upon detecting that the device has crossed a virtual barrier (e.g., a geofence) or entered within a virtual geographic vicinity. For example, upon detecting that the user device has entered a retail store location, a public key associated with that retail store may be transmitted to the user device. In some implementations, the second encryption key may be received from an access device. For example, the second encryption key may be provided by an access device along with information related to a transaction to be completed.

At 706, resource information may be received. As a first example, the resource information may be received as part of information related to a transaction to be completed. For example, the user device may be provided with a number of resources (e.g., goods and/or services) as well as various data related to the resources (e.g., quantity, price, etc.). As a second example, the resource information may be received as part of a request to access a resource in a secure area. In this example, the resource information may include one or more conditions that must be met to gain access to the secure area. The resource information may include an indication of conditions that need to be met to complete a transaction to acquire the resources. For example, the resource information may be provided with a list of acceptable access credentials. In this example, a generated message must include one of the indicated access credentials in order to complete the transaction.

At 708, a message may be generated that includes at least a first portion encrypted using the first encryption key and a second portion encrypted using the at least one second encryption key. In some embodiments, an access server and authorization computer may each be identified as being associated with a transaction. The first encryption key may be associated with the authorization computer and the second encryption key may be associated with the access server. For example, the user device may receive an indication that the access credential is to be used to complete the transaction. In this example, an issuer associated with the access credential may be identified as the authorization computer and a first portion of the message may be generated by encrypting a subset of data with an encryption key associated with that issuer. Additionally, in this example, an access server may be identified as being associated with a provider of the resource (e.g., an acquirer computer for the resource provider) and a second portion of the message may be generated by encrypting a second subset of data with an encryption key associated with that access server.

At 710, the generated message may be provided to at least one second computing entity. In some embodiments, the generated message may be provided to multiple computing entities in parallel. For example, the message may be provided to the authorization server and the access server in parallel. In some embodiments, the generated message may be provided to multiple entities in a series. For example, the message may be provided to the access device, which may provide at least a portion of the message to the access server. In this example, the portion of the message may then be forwarded to the authorization server by the access server.

In accordance with at least some embodiments, each computing entity provided with the message generated using process 700 may have access to only the subset of data included in an encrypted portion of data associated with the computing entity. For example, an access server may have access to only the encrypted portion of data intended for consumption by a computing entity fulfilling the role of access server.

V. Example Devices

In accordance with at least some embodiments, the system, apparatus, methods, processes and/or operations for a platform capable of generating secure communications for use in conducted transactions may be wholly or partially implemented in the form of a set of instructions executed by one or more programmed computer processors such as a central processing unit (CPU) or microprocessor. Such processors may be incorporated in an apparatus, server, client or other computing device operated by, or in communication with, other components of the system. The subsystems of an exemplary system may be interconnected via a system bus. Additional subsystems include a printer, a keyboard, a fixed disk, and a monitor, which is coupled to a display adapter. Peripherals and input/output (I/O) devices, which couple to an I/O controller, can be connected to the computer system by any number of means known in the art, such as a serial port. For example, the serial port or an external interface can be utilized to connect the computer device to further devices and/or systems, including a wide area network such as the Internet, a mouse input device, and/or a scanner. The interconnection via the system bus allows one or more processors to communicate with each subsystem and to control the execution of instructions that may be stored in a system memory and/or the fixed disk, as well as the exchange of information between subsystems. The system memory and/or the fixed disk may embody a tangible computer-readable medium.

A computer system can include a plurality of the same components or subsystems, e.g., connected together by an external interface or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

Embodiments of the invention provide for a number of technical advantages. For example, embodiments of the invention enable a user device to generate a secure communication to complete a transaction, even if the user device is not currently in communication with a server. Additionally, a recipient of the generated message may only access the data that is intended for that recipient, and may do so without needing any portion of the message to be decrypted by any other entity. Hence, a message generated by the user device in this fashion may be provided to one or more of the intended recipients in any order. In some cases, all recipients may be provided the message at the same time, speeding up the authorization process.

Additionally, embodiments of the invention enable the use of multiple secure channels, which strengthens the security of the system. For example, a user device may establish a secure channel with a number of different entities (e.g., via a Diffie-Hellman key exchange). Each entity is then only provided with the information relevant to that entity. The user device may then transmit the message to each of those entities in parallel. In a conventional system, a compromise in the message forwarding system at any point (e.g., if one of the entities in the series forwarding example is compromised) can result in exposure of all of the data in the message. However, in embodiments of the current disclosure, even if an authorized recipient of the message is compromised, an unauthorized party can only gain access to the data relevant to that authorized entity.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer-readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices.

Such programs may also be encoded and transmitted using carrier signals adapted for transmission via wired, optical, and/or wireless networks conforming to a variety of protocols, including the Internet. As such, a computer-readable medium according to at least some embodiments of the present invention may be created using a data signal encoded with such programs. Computer-readable media encoded with the program code may be packaged with a compatible device or provided separately from other devices (e.g., via Internet download). Any such computer-readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising performing, by a user device:
   storing, in a secure memory of the user device, a credential and a first encryption key for encrypting the credential for sending in a communication to an authorization server, the authorization server providing an authorization response regarding whether to authorize the user device to gain access to a resource;
   obtaining, via a local communication interface, a second encryption key for encrypting data associated with an access server;
   receiving, from an access device that is local to the user device, resource information about the resource;
   generating, by the user device, a message including at least:
      a first portion of data encrypted using the first encryption key, wherein the first portion of data is configured to be decrypted by the authorization server, the first portion of data including the credential; and a second portion of data encrypted using the second encryption key, wherein the second portion of data is configured to be decrypted by the access server, the second portion including at least a portion of the resource information, wherein the first portion of data is different from the second portion of data; and providing the message such that the message is sent over a wide area network to the authorization server and the access server, the message triggering the authorization server to provide the authorization response.

2. The method of claim 1, wherein the second encryption key is received from the access device.

3. The method of claim 1, wherein the local communication interface is a scanning device, and the method further comprises scanning a machine readable code using the scanning device to obtain the second encryption key.

4. The method of claim 1, wherein the message is provided to the authorization server and the access server in parallel.

5. The method of claim 1, wherein the message is provided to the access device, which provides at least a portion of the message to the access server, wherein the portion of the message is then forwarded to the authorization server by the access server.

6. The method of claim 1, wherein the access server is only able to decrypt the second portion of data.

7. The method of claim 1, further comprising:
creating multiple secure channels between the user device and multiple computing entities, the multiple computing entities including at least the authorization server and the access server, wherein the first encryption key is generated during creation of a first secure channel between the user device and the authorization server, and wherein the second encryption key is generated during creation of a second secure channel between the user device and the access server.

8. A user device comprising:
one or more processors; and
a non-transitory computer readable medium storing instructions that, when executed by the one or more processors, cause the one or more processors to:
store, in a secure memory of the user device, a credential and a first encryption key for encrypting the credential for sending in a communication to an authorization server, the authorization server Providing an authorization response regarding whether to authorize the user device to gain access to a resource;
obtain a second encryption key via a local communication interface, the second encryption key for encrypting data associated with an access server;
receive, from an access device that is local to the user device, resource information about the resource;
generate a secure message that includes at least;
a first portion of data encrypted using the first encryption key, wherein the first portion of data is configured to be decrypted by the authorization server, the first portion of data including the credential; and
a second portion of data encrypted using the second encryption key, wherein the second Portion of data is configured to be decrypted by the access server, the second portion including at least a portion of the resource information, wherein the first portion of data is different from the second portion of data; and
transmit the generated secure message to the access device.

9. The user device of claim 8, wherein the secure message also includes a header indicating a first location of the first portion of data and a second location of the second portion of data.

10. The user device of claim 8, wherein the instructions further cause the one or more processors to:
receive a first encryption protocol from the authorization server, wherein the first portion of data in the secure message is encrypted using the first encryption protocol; and
receive a second encryption protocol from the access server via the local communication interface, wherein the second portion of data in the secure message is encrypted using the second encryption protocol.

11. The user device of claim 8, wherein the second encryption key is received from the access server via a short range communication protocol.

12. The user device of claim 11, wherein the short range communication mechanism is one of a near-field communications (NFC), Bluetooth, Bluetooth low-energy (BLE), a wireless local area network (e.g., WiFi), or iBeacon.

13. The user device of claim 8, wherein the secure message includes an access credential to be used to complete a transaction.

14. The user device of claim 8, wherein the access device is a point of sale device associated with a resource provider.

15. The user device of claim 8, wherein the access device enables access to a secure area or storage.

16. An authorization computer comprising:
a processor; and
a memory including instructions that, when executed with the processor, cause the authorization computer to, at least:
receive, from a user device, a request for an access credential, the access credential capable of being used to access a resource;
provide, in response to receiving the request, the access credential and an encryption key;
receive, from a computing device, an authorization request message, the authorization request message comprising multiple portions of data, each encrypted using a different encryption key, a first portion of data of the multiple portions of data being encrypted using the encryption key and the first portion of data including the access credential;
decrypt the first portion of data to identify transaction data and to obtain the access credential;
determine, based at least in part on the transaction data and the access credential, whether to approve a transaction to access the resource; and
provide an authorization response message to a provider computer that provides the resource, wherein the provider computer is configured to decrypt a second portion of data of the authorization request message using a second encryption key.

17. The authorization computer of claim 16, wherein the computing device is a local device within a vicinity of the user device.

18. The authorization computer of claim 16, wherein the authorization computer is only able to decrypt the first portion of data.

19. The authorization computer of claim 16, wherein the authorization request message is transmitted to multiple recipient computing entities.

20. The authorization computer of claim 19, wherein each of the multiple portions of data are configured to be decrypted by one of the multiple recipient computing entities.

\* \* \* \* \*

UNITED STATES PATENT AND TRADEMARK OFFICE
CERTIFICATE OF CORRECTION

PATENT NO. : 10,972,257 B2  
APPLICATION NO. : 16/084480  
DATED : April 6, 2021  
INVENTOR(S) : Eric Le Saint et al.

Page 1 of 1

It is certified that error appears in the above-identified patent and that said Letters Patent is hereby corrected as shown below:

On the Title Page

Under item (12), First Inventor's last name, replace "Saint et al." with --Le Saint et al.--

Signed and Sealed this  
Fourteenth Day of September, 2021

Drew Hirshfeld  
*Performing the Functions and Duties of the*  
*Under Secretary of Commerce for Intellectual Property and*  
*Director of the United States Patent and Trademark Office*